United States Patent
Han et al.

(10) Patent No.: US 7,577,975 B2
(45) Date of Patent: Aug. 18, 2009

(54) APPARATUS FOR DISTRIBUTING SAME/DIFFERENT DIGITAL BROADCASTING STREAMS IN HETEROGENEOUS HOME NETWORK AND METHOD THEREOF

(75) Inventors: Intark Han, Taejon (KR); Youn Kwae Jeong, Taejon (KR); Kwang Roh Park, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 698 days.

(21) Appl. No.: 11/185,685

(22) Filed: Jul. 21, 2005

(65) Prior Publication Data

US 2006/0136968 A1    Jun. 22, 2006

(30) Foreign Application Priority Data

Dec. 20, 2004  (KR) ............... 10-2004-0108907

(51) Int. Cl.
*H04N 7/18* (2006.01)
(52) U.S. Cl. .................. 725/80; 725/49; 725/71; 725/82; 725/133
(58) Field of Classification Search ............ 725/49, 725/80, 82, 133, 141, 153
See application file for complete search history.

(56) References Cited

U.S. PATENT DOCUMENTS

2003/0161332 A1* 8/2003 Ohno et al. ............. 370/401
2003/0226149 A1* 12/2003 Chun et al. ............. 725/78
2004/0172658 A1* 9/2004 Rakib et al. ............ 725/120
2006/0085835 A1* 4/2006 Istvan et al. ............ 725/119

FOREIGN PATENT DOCUMENTS

| KR | 1020010011318 | 2/2001 |
| KR | 1020030035745 | 5/2003 |
| KR | 1020030072154 | 9/2003 |
| KR | 1020030085326 | 11/2003 |
| WO | 03/045012 | 5/2003 |

* cited by examiner

*Primary Examiner*—Andrew Y Koenig
*Assistant Examiner*—Anthony Bantamoi
(74) *Attorney, Agent, or Firm*—Lowe Hauptman Ham & Berner, LLP (57) ABSTRACT

Disclosed are an apparatus for distributing same/different digital broadcasting streams in a heterogeneous home network and a method thereof The apparatus includes a home gateway, and a home server, connected to the home gateway through Ethernet and also connected to a PC, a second IP STB, a 1394 STB, an HAS (Home Auto System) and an HDTV receiver, for outputting a ground-wave broadcast, a satellite broadcast and a cable broadcast to their HDTV receivers, respectively, through the second IP STB and the 1394 STB if the ground-wave broadcast, the satellite broadcast and the cable broadcast are received through coaxial cables, interworking with the HAS in order to control home appliances, and directly outputting the broadcast to the HDTV receiver through a built-in STB function. According to the apparatus, a user having a plurality of HDTV receivers at home can simultaneously view a plurality of HDTV broadcasts irrespective of the broadcasting systems when a plurality of heterogeneous home networks match through a home network matching device.

7 Claims, 6 Drawing Sheets

APPARATUS FOR DISTRIBUTING SAME/DIFFERENT DIGITAL BROADCASTING STREAMS IN HETEROGENEOUS HOME NETWORK AND METHOD THEREOF

BACKGROUND OF THE INVENTION

1. Field of the Invention

The present invention relates to an apparatus for distributing same/different digital broadcasting streams in a heterogeneous home network and a method thereof, an more particularly, to an apparatus for distributing same/different digital broadcasting streams in a heterogeneous home network and a method thereof that can provide HDTV broadcasts of plural channels at home by simultaneously receiving a plurality of digital broadcasting channel signals through a plurality of tuners capable of receiving a plurality of same/different digital broadcasts and outputting one of the received channel signals to an HDTV receiver through an MPEG2 decoder while transferring the remaining channel signals to HDTV receiving devices connected through a heterogeneous wire/wireless home network at home.

2. Background of the Related Art

Conventionally, in order to receive HDTV broadcasts, a digital STB (Set Top Box) is provided along with an HDTV receiver, so that it decodes HDTV channel signals and transmits decoded video signals to the HDTV receiver. The conventional STB may have one broadcasting tuner to receive one channel signal, or may have plural HDTV broadcasting tuners to receive plural broadcasts, for example, ground-wave digital broadcasts, satellite digital broadcasts and cable digital broadcasts. In this case, if a user selects one of the plural broadcasts, only the selected broadcast is transmitted to the HDTV receiver so that the selected broadcast is viewed through the HDTV receiver.

However, according to the conventional STB as described above, as the user selects one broadcast, only one tuner that corresponds to the selected broadcast is used but the two remaining tuners are not in use although three tuners are provided in the STB to cause a high cost in implementing the STB.

SUMMARY OF THE INVENTION

Accordingly, the present invention is directed to an apparatus for distributing same/different digital broadcasting streams in a heterogeneous home network and a method thereof that substantially obviate one or more problems due to limitations and disadvantages of the related art.

It is an object of the present invention to provide an apparatus for distributing same/different digital broadcasting streams in a heterogeneous home network and a method thereof that enable a user to select and simultaneously view a plurality of broadcasts having different broadcasting systems and to view channel broadcasts the number of which corresponds to the number of installed tuners if one of the broadcasting systems desired by the user is selected.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

In order to achieve the above and other objects, there is provided an apparatus for distributing same/different digital broadcasting streams in a heterogeneous home network, according to the present invention, which comprises a home gateway, connected through Ethernet to a first IP (Internet Protocol) STB (Set Top Box) connected to an HDTV receiver, for accessing the network, and a home server, connected to the home gateway through Ethernet and also connected to a PC, a second IP STB, a 1394 STB, an HAS (Home Auto System) and an HDTV receiver, for outputting a ground-wave broadcast, a satellite broadcast and a cable broadcast to their HDTV receivers, respectively, through the second IP STB and the 1394 STB if the ground-wave broadcast, the satellite broadcast and the cable broadcast are received through coaxial cables, interworking with the HAS in order to control home appliances, and directly outputting the broadcast to the HDTV receiver through a built-in STB function.

In another aspect of the present invention, there is provided a method of distributing same/different digital broadcasting streams in a heterogeneous home network that controls a broadcasting tuner, selects a corresponding channel simultaneously and outputs a broadcasting TS (Transport Stream) of the selected channel to an IP (Internet Protocol) STB (Set Top Box) if a user inputs broadcast and channel selection information through the IP STB, the method comprising a $101^{st}$ step of transmitting a message having the broadcast and channel selection information input by the user if the EP STB receives an input of the broadcast and channel selection information from the user, a $102^{nd}$ step of searching for tuner type information from the received message and determining a tuner type of the broadcast required by the user, a $103^{rd}$ step of receiving the corresponding channel broadcast among received IP broadcasts and transmitting the received channel broadcast to an HDTV receiver through the IP STB if the tuner type determined at the $102^{nd}$ step corresponds to an IP tuner, a $104^{th}$ step of transferring a control signal having a tuner number and a channel number and destination IP information if the tuner type determined at the $102^{nd}$ step corresponds to a ground-wave tuner, and a $105^{th}$ step of receiving the broadcasting TS of the corresponding channel extracted by the ground-wave tuner and transferring the broadcasting TS of the corresponding channel to the IP STB.

In still another aspect of the present invention, there is provided a method of distributing same/different digital broadcasting streams in a heterogeneous home network that controls a broadcasting tuner, selects a corresponding channel simultaneously and outputs a broadcasting TS (Transport Stream) of the selected channel to a 1394 STB (Set Top Box) if a user inputs broadcast and channel selection information through the 1394 STB, the method comprising a $106^{th}$ step of transmitting a message having the broadcast and channel selection information input by the user if the user of the 1394 STB receives an input of the broadcast and channel selection information, a $107^{th}$ step of searching for tuner type information from the received message and determining a tuner type of the broadcast required by the user, a $108^{th}$ step of transferring a control signal having a tuner number and a channel number and 1394 ID information of a destination if the tuner type determined at the $107^{th}$ step corresponds to a satellite tuner, and a $109^{th}$ step of carrying the selected broadcasting TS on a 1394 frame with the destination 1394 ID and transferring the broadcasting TS to the 1394 STB if the satellite tuner receives an input of the broadcasting TS of the corresponding channel extracted by the satellite tuner.

In still another aspect of the present invention, there is provided a method of distributing same/different digital broadcasting streams in a heterogeneous home network that controls a broadcasting tuner, selects a corresponding channel simultaneously and outputs a broadcasting TS (Transport Stream) of the selected channel to a home server if a user directly inputs broadcast and channel selection information through the home server, the method comprising a $201^{st}$ step of transmitting a message having the broadcast and channel selection information input by the user if the home server receives an input of the broadcast and channel selection information from the user, a $202^{nd}$ step of searching for tuner type information from the received message and determining a tuner type of the broadcast required by the user, a $203^{rd}$ step of receiving the corresponding channel broadcast among input IP broadcasts, removing an IP header from the received channel broadcast, decoding the channel broadcast, and transmitting the decoded channel broadcast to an HDTV receiver if the tuner type determined at the $202^{nd}$ step corresponds to an IP tuner, and a $204^{th}$ step of simultaneously transferring a control signal having a tuner number and a channel number and the broadcasting TS of the corresponding channel extracted by a cable tuner to the home server if the tuner type determined at the $202^{nd}$ step corresponds to a cable tuner.

In still another aspect of the present invention, there is provided a method of distributing same/different digital broadcasting streams in a heterogeneous home network that controls a broadcasting tuner, selects a corresponding channel simultaneously and outputs a broadcasting TS (Transport Stream) of the selected channel to an IP (Internet Protocol) STB (Set Top Box) if a user directly inputs broadcast and channel selection information through the IP STB connected to a home gateway, the method comprising a $205^{th}$ step of transmitting a packet having a tuner number and a channel number input by the user if broadcast and channel selection information is received from the user of the IP STB, a $206^{th}$ step of determining a type of the broadcast required by the user from the received tuner number, a $207^{th}$ step of simultaneously transferring a control signal having the tuner number and the channel number and destination IP information if the tuner type determined at the $206^{th}$ step corresponds to a ground-wave tuner, and a $208^{th}$ step of carrying the selected broadcasting TS of the corresponding channel extracted by the ground-wave tuner on a destination IP and transferring the broadcasting TS to the IP STB.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

The apparatus for distributing same/different digital broadcasting streams in a heterogeneous home network and the method thereof according to the preferred embodiment of the present invention will now be explained in detail with reference to the accompanying drawings.

Figure 1:
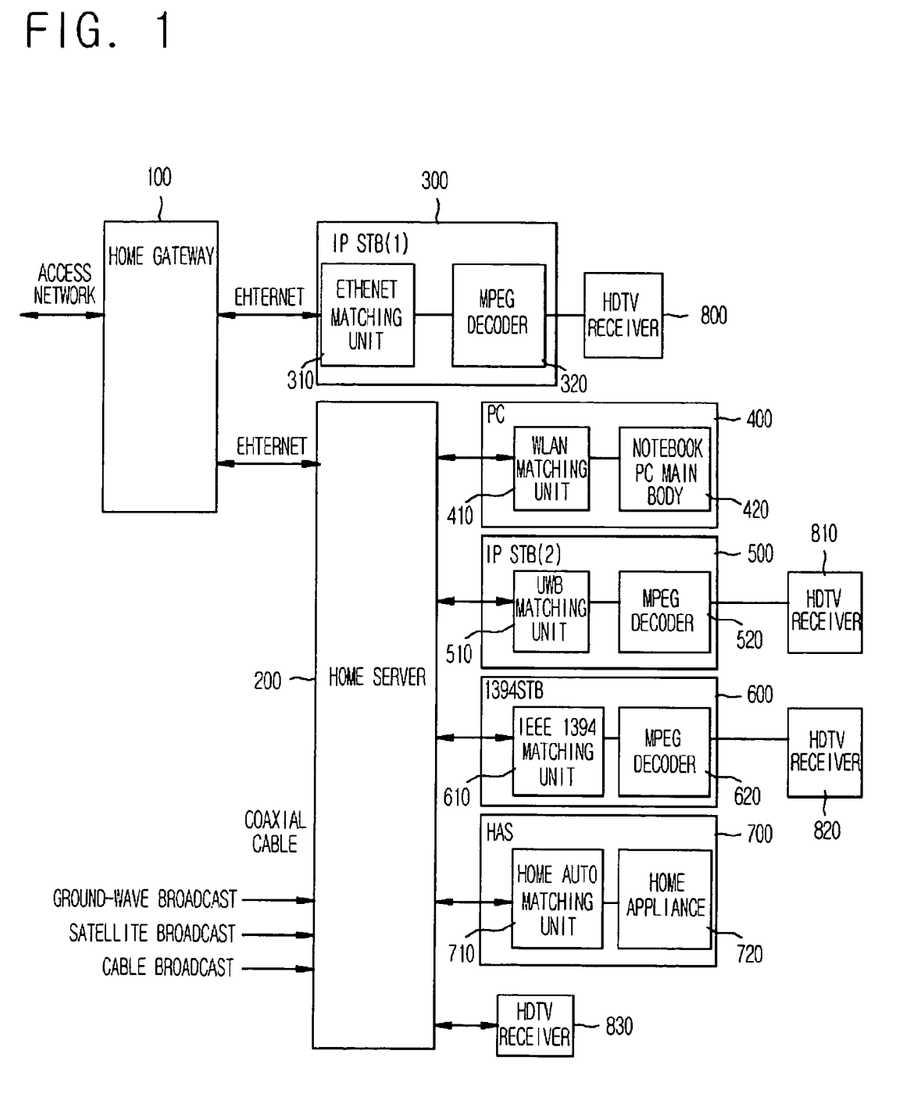
FIG. 1 is a block diagram illustrating the construction of an apparatus for distributing same/different digital broadcasting streams in a heterogeneous home network according to an embodiment of the present invention.

FIG. 1 is a block diagram illustrating the construction of an apparatus for distributing same/different digital broadcasting streams in a heterogeneous home network according to an embodiment of the present invention.

Referring to FIG. 1, a home gateway 100 is connected to an IP (Internet Protocol) STB (Set Top Box) 300 composed of an Ethernet matching unit 310 and an MPEG (Moving Picture Experts Group) decoder 320 through Ethernet, and is also connected to a home server 200 through Ethernet. The home server 200 receives broadcasts through coaxial cables for receiving ground-wave broadcasts, satellite broadcasts and cable broadcasts. The home server 200 matches a PC (Personal Computer) 400 composed of a network PC main body 420 having a WLAN (Wireless LAN) matching unit 410, and outputs a broadcasting signal to an HDTV receiver 810 through an IP STB 500 having a UWB (Ultra-WideBand) matching unit 510 and an MPEG decoder 520.

Additionally, the home server 200 outputs a broadcasting signal to an HDTV receiver 820 through a 1394 STB 600 having an IEEE 1394 matching unit 610 and an MPEG decoder 620, and interworks with a HAS (Home Auto System) 700 in order to control a home appliance 720 through a home automation matching unit 710. The home server 200 directly outputs the broadcasting signal to an HDTV receiver through a built-in STB function.

Figure 2:
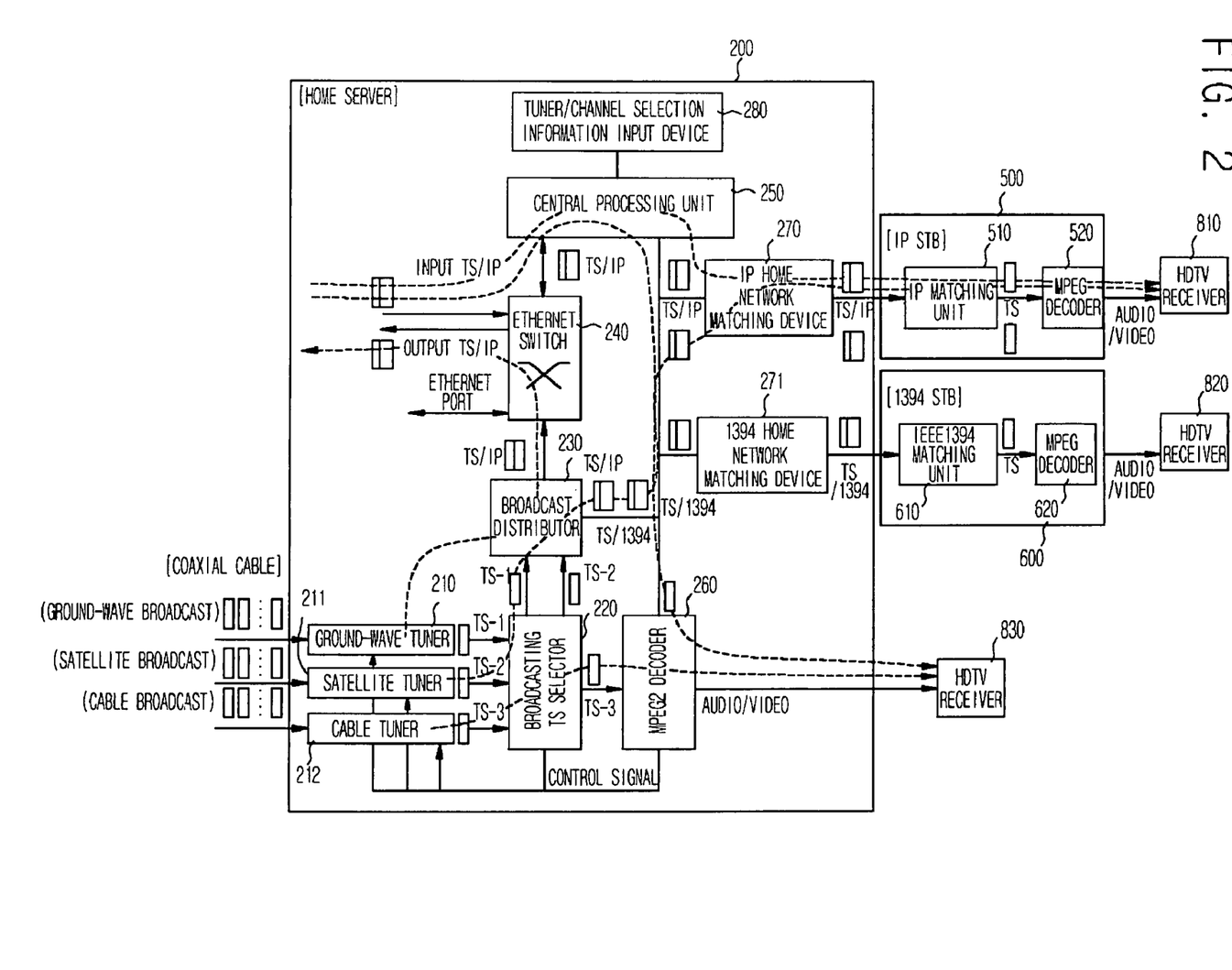
FIG. 2 is a block diagram illustrating the construction of a home server in the apparatus for distributing same/different digital broadcasting streams in a heterogeneous home network as illustrated in FIG. 1.

FIG. 2 is a block diagram illustrating the construction of the home server in the apparatus for distributing same/different digital broadcasting streams in a heterogeneous home network as illustrated in FIG. 1. Referring to FIG. 2, the home server 200 receives an IP broadcasting TS (Transport Stream) being carried on an IP through an Ethernet port, and receives the ground-wave broadcast, satellite broadcast and cable broadcast through separate coaxial cables. Also, the home server 200 extracts the TS of the broadcasting channel desired by the user and transfers the extracted TS to a home network.

The IP broadcast TS being carried on the IP is transferred to a central processing unit 250 through the Ethernet port and an Ethernet switch 240 of the home server 200. In this case, the central processing unit 250 recognizes the received IP broadcasting TS, removes an IP header from the received IP broadcasting TS, and transmits the IP broadcasting TS to an MPEG2 decoder 260. Meanwhile, the IP broadcasting TS to be transmitted to the H) STB 500 through an IP home network matching device 270 is transferred with the IP header attached thereto.

A ground-wave tuner 210 receives a ground-wave broadcast through the coaxial cable and extracts a ground-wave broadcasting TS. A satellite tuner 211 receives a satellite broadcast 203 through the coaxial cable and extracts a satellite broadcasting TS. A cable broadcasting tuner 212 receives a cable broadcast through the coaxial cable and extracts a cable broadcasting TS. The three broadcasting TSs extracted as above are input to a broadcasting TS selector 220, and the broadcasting TS selector 220 transmits one of the broadcasting TSs to the MPEG2 decoder 260. The MPEG2 decoder 260 decodes the received broadcasting TS and outputs the decoded broadcasting TS to an HDTV receiver 830 connected to the MPEG2 decoder 260, while it transmits the two remaining broadcasting TS to the broadcast distributor 230.

If the destination of the selected broadcasting TS is the IP STB 500, the broadcast distributor 230 converts the selected broadcasting TS into a packet of a broadcasting TS over an IP, and transmits the packet to the destination of the selected broadcasting TS through the IP home network matching device 270. By contrast, if the destination of the selected broadcasting TS is the 1394 STB 600, the broadcasting distributor 230 converts the broadcasting TS into a packet of a broadcasting TS over a 1394 frame, and transmits the packet to the destination through a 1394 home network matching device 271. Meanwhile, if the broadcasting TS to be transmitted to an outside of the home server 200 through the Ethernet switch 240 is received, the broadcast distributor 230 prepares a packet in the form of a broadcasting TS over an IP, and transfers the packet to the Ethernet switch 240. The Ethernet switch 240 transmits the packet of the broadcasting TS over an IP through the destination Ethernet port.

In this case, the channel of the IP broadcast, ground-wave broadcast, satellite broadcast and cable broadcast may be selected by the user's direct input of selection information through a tuner/channel selection information input device 280 located in the home server, by the user's input of the selection information through the IP STB 500 or the 1394 STB 600 and the transfer of the selection information to the central processing unit 250 in the form of a message, or by the user's input of the selection information through an IP STB 300 connected to the home gateway 100 of FIG. 1 and the transfer of the selection information to the central processing unit 250 of the home server 200. Then, the central processing unit 250 transfers the message to the MPEG2 decoder 260, and the MPEG2 decoder 260 generates a control signal for controlling the ground-wave tuner 210, the satellite tuner 211 and the cable tuner 212. Simultaneously, the central processing unit 250 transfers information capable of generating an IP header or a 1394 header that is required by the broadcast distributor 230 in order to match the user's tuner and channel selection information to the broadcast distributor 230.

Figure 3:
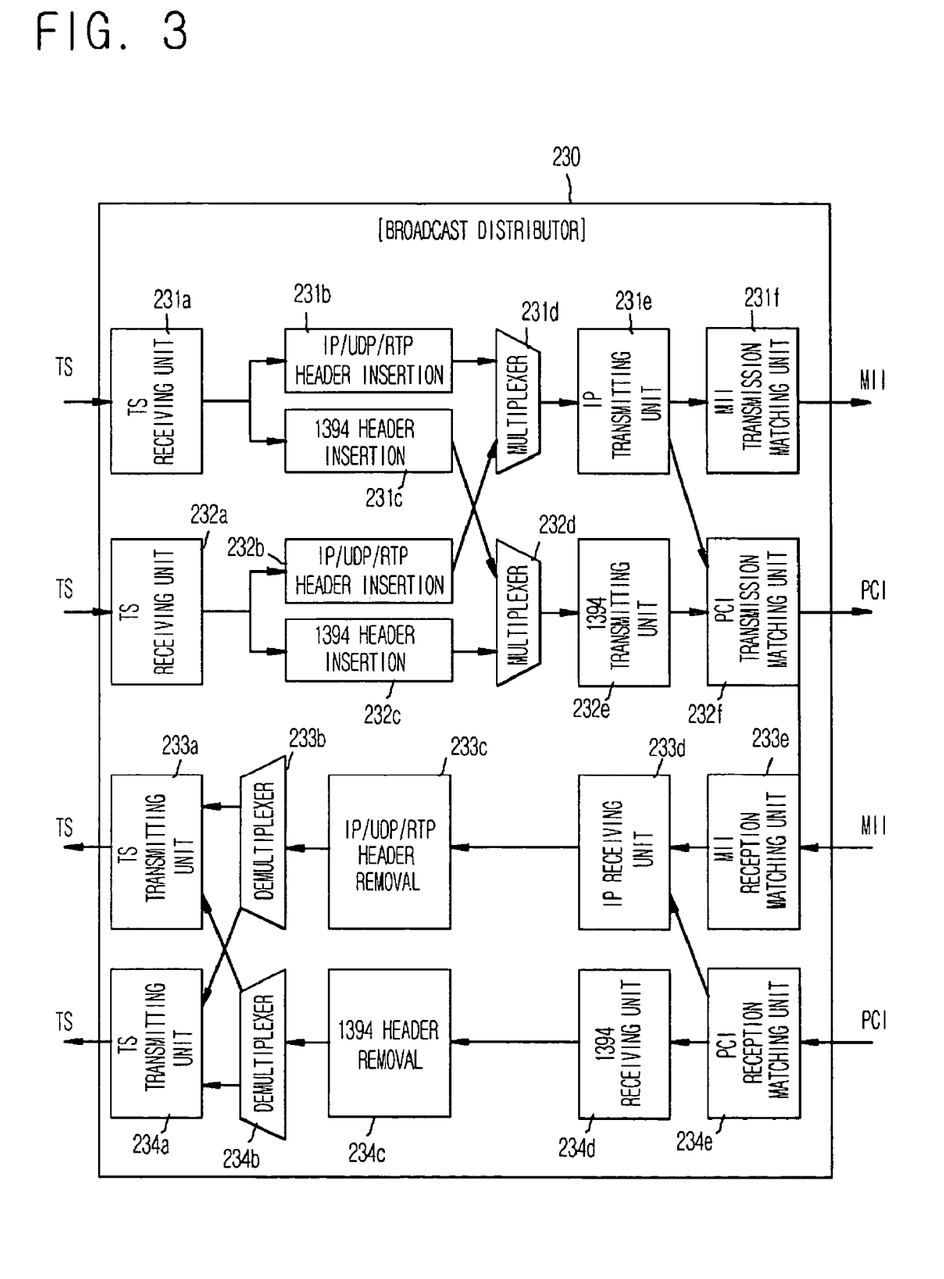
FIG. 3 is a block diagram illustrating the construction of a broadcast distributor in the home server as illustrated in FIG. 2.

FIG. 3 is a block diagram illustrating the construction of the broadcast distributor in the home server as illustrated in FIG. 2. The broadcast distributor simultaneously receives two broadcasting TSs from the broadcasting TS selector 220. In this case, the reception of the broadcasting TSs is performed by TS receiving units 231*a* and 232*a*. The TS receiving units 231*a* and 232*a* generate headers 231*b*, 231*c* and 232*b*, 232*c* that match the protocol for transferring the broadcasting TSs to the destination using header generation information received from the central processing unit 250 of FIG. 2 according to the destination of the received broadcasting TSs, and multiplexers 231*d* and 232*d* multiplexes the packets by the same header information. The packets multiplexed using the IP as a discriminator passes through an IP transmitting unit 231*e*. If it is judged that the next destination is the Ethernet, the multiplexed packet is transmitted through an MII transmission matching unit 331*f*, while if it is judged that the next destination follows PCI, it is transmitted through a PCI transmission matching unit 232*f* Meanwhile, the packet multiplexed using the 1394 device number as a discriminator is transmitted through a 1394 transmitting unit 232*e* and a PCI transmission matching unit 232*f*.

By contrast, the broadcasting TS input through the Ethernet switch 240 is received by an MII reception matching unit 233*e* through an MII interface, and the broadcasting TS input through the PCI is received by a PCI reception matching unit 234*e*. In this case, if the received broadcasting TS is a packet over an IP, the received TS is processed by an IP receiving unit 233*d*, and IP, UDP and RTP (Real Time Protocol) headers 233*c* are removed from the broadcasting TS. Then, the broadcasting TS is transmitted to the broadcasting TS selector 220 of FIG. 2 through a demultiplexer 233*b* and TS transmitting units 233*a* and 234*a*. Meanwhile, if the received broadcasting TS is a packet over a 1394 frame, the received broadcasting TS is processed by a 1394 receiving unit 234*d*, and a 1394 header 234*c* is removed from the broadcasting TS. Then, the broadcasting TS is transmitted to the broadcasting TS selector 220 of FIG. 2 through a demultiplexer 234*b* and the TS transmitting units 233*a* and 234*a*.

Figure 4:
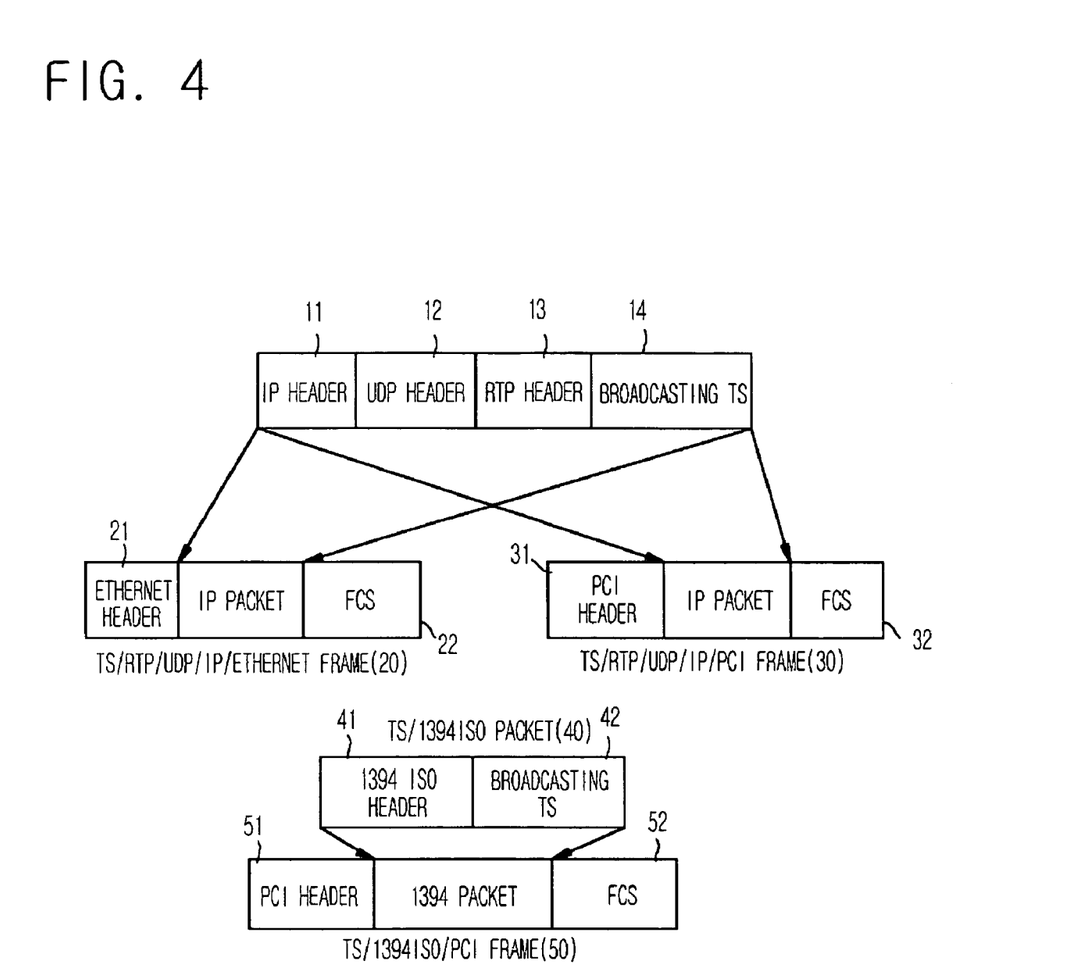
FIG. 4 is a view illustrating the frame structure of a broadcasting TS transmitted by a broadcast distributor as illustrated in FIG. 3.

FIG. 4 is a view illustrating the frame structure of the broadcasting TS that is transmitted to the destination by the broadcast distributor 230 of FIG. 2 using the protocol of the destination. For example, an RTP (Real Time Protocol) header 13 and a UDP header 12 are inserted into the broadcasting TS 14 that is transmitted in the form of an IP packet 10 in order. Then, an IP header 11 is inserted into the broadcasting TS 14 to make an IP packet 10. If this IP packet 10 is transmitted, being carried on an Ethernet frame 20, an Ethernet header 21 and a FCS (Frame Check Sum) 22 are attached thereto to complete the Ethernet frame 20. Meanwhile, if the IP packet 10 is transmitted, being carried on a PCI frame 30, a PCI header 31 and an FCS 32 are attached thereto to complete the PCI frame. Additionally, a 1394 ISO (Isochronous) header 41 is attached to the broadcasting TS 42 being transmitted in the form of a 1395 packet 40 to form a 1394 packet 40, and when the 1304 packet is transmitted, being carried on a PCI frame 50, a PCI header 51 and an FCS 52 are attached to the 1304 packet to complete the PCI frame 50.

Figure 5:
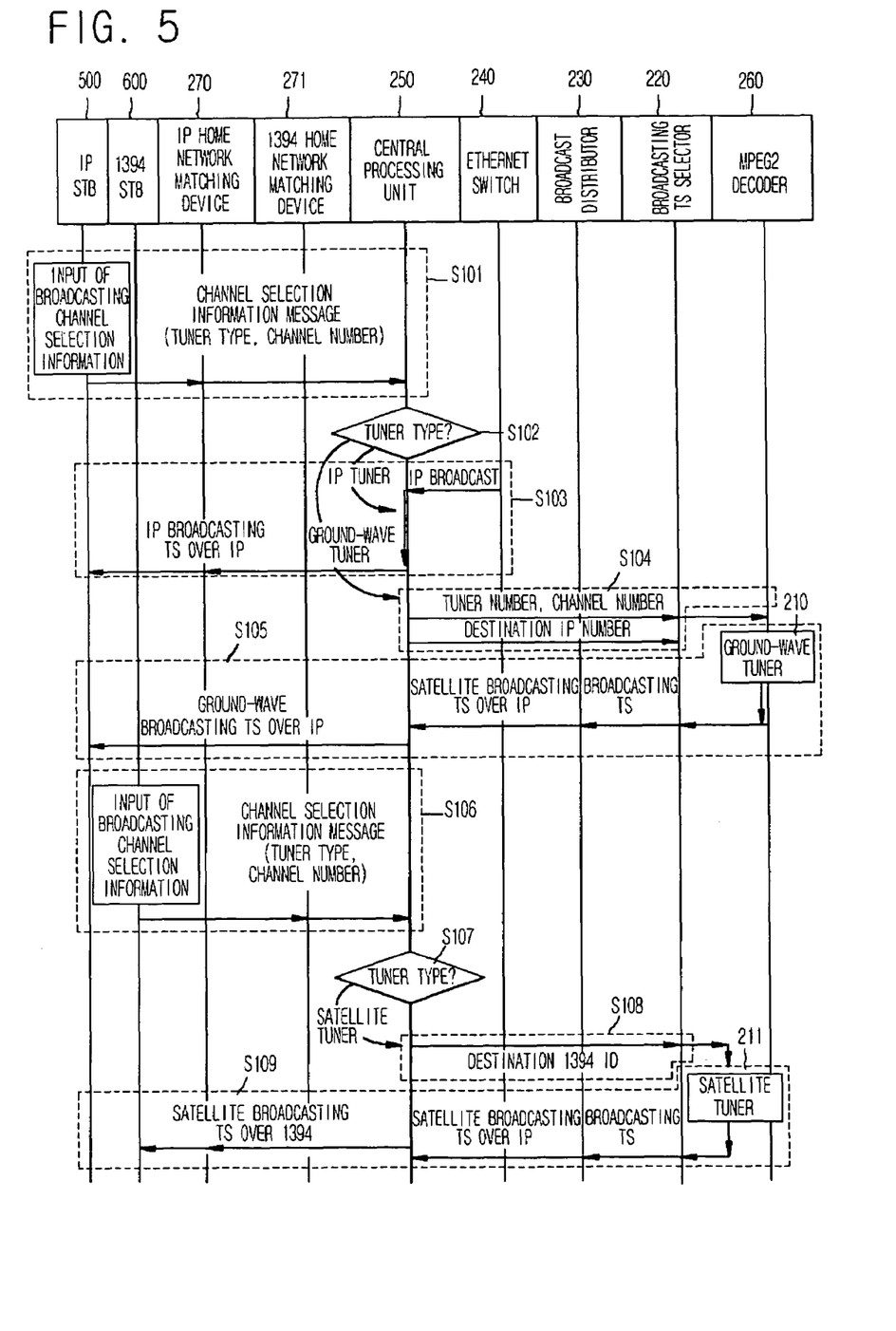
FIG. 5 is a view illustrating a method of selecting a broadcasting tuner and a channel performed by a home network matching device in a method of distributing same/different digital broadcasting streams in a heterogeneous home network according to an embodiment of the present invention.

FIG. 5 is a view illustrating a method of selecting a broadcasting tuner and a corresponding channel performed by a home network matching device in a method of distributing same/different digital broadcasting streams in a heterogeneous home network according to an embodiment of the present invention. If a user inputs broadcast and channel selection information through an IP STB 500 or a 1394 STB 600 of FIG. 2, the corresponding channel is selected through the control of broadcasting tuners 210, 211 and 212 and the broadcasting TS is transmitted through the broadcast distributor 230.

First, if the IP STB 280 receives an input of broadcast and channel selection information from the user, it sends a message having the broadcast and channel selection information input by the user to the central processing unit 250 through the IP home network matching device 270 (step S101). The central processing unit 250 searches for tuner type information from the received message, and determines a tuner type of the broadcast required by the user (step S102). If the tuner is an IP tuner, the central processing unit 250 receives the corresponding channel broadcast among received IP broadcasts input to the Ethernet switch 240, and transmits the corresponding channel broadcast to the IP STB 500 through the IP home network matching device 270. The IP STB 500 decodes the received channel broadcast and transmits the decoded channel broadcast to the following HDTV (step S103).

If the broadcast desired by the user is a ground-wave broadcast, the central processing unit 250 transfers a control signal having the tuner number and the channel number to the broadcasting TS selector 220, and transfers destination IP information to the broadcast distributor 230 (step S104). Then, the broadcasting TS of the corresponding channel extracted by the ground-wave tuner 210 is transferred to the broadcast distributor 230 through the broadcasting TS selector 220, and the broadcast distributor 230 carries the selected broadcasting TS on the destination IP, and transfers the broadcasting TS to the IP STB 500 through the central processing unit 250 and the IP home network matching device 270 (step S105).

Meanwhile, if the user of the 1394 STB 600 inputs broadcast and channel selection information, the 1394 STB 600 sends a message having the broadcast and channel selection information input by the user to the central processing unit 250 through the 1394 home network matching device 271 (step S106). The central processing unit 250 searches for tuner type information from the received message, and determines a tuner type of the broadcast required by the user (step S107). If the tuner is a satellite tuner, the central processing unit 250 transfers the control signal having the tuner number and the channel number to the broadcasting TS selector 220, and transfers the 1394 ID information of the destination to the broadcast distributor 230 (step S108). Then, the broadcasting TS of the corresponding channel extracted by the satellite tuner 211 is transferred to the broadcast distributor 230 through the broadcasting TS selector 220, and the broadcast distributor 230 carries the selected broadcasting TS on the 1394 frame with the destination 1394 ID, and transfers the broadcasting TS to the 1394 STB 600 through the central processing unit 250 and the IP home network matching device 270 (step S109).

Figure 6:
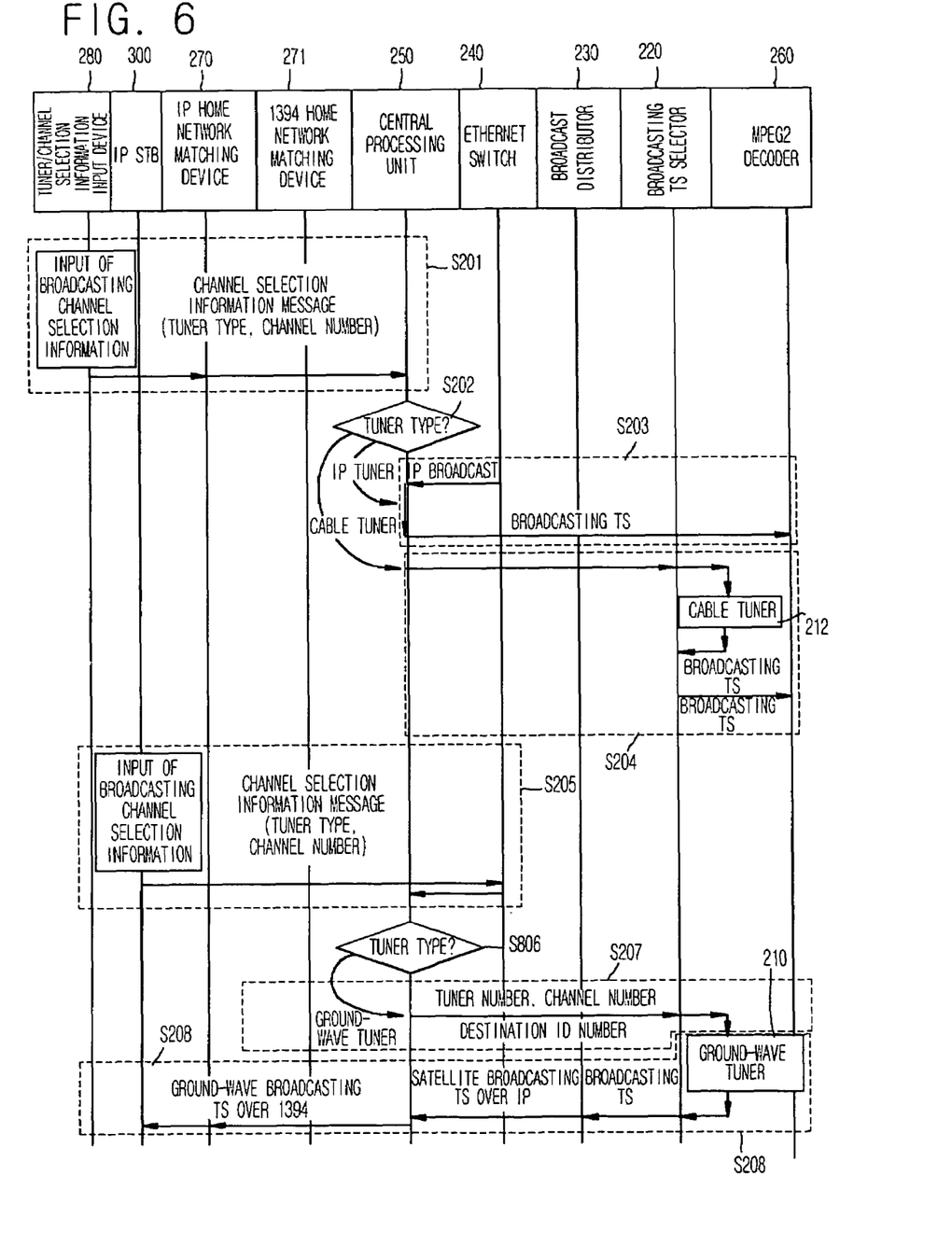
FIG. 6 is a view illustrating a method of selecting a broadcasting tuner and a channel performed by an IP STB in a method of distributing same/different digital broadcasting streams in a heterogeneous home network according to an embodiment of the present invention.

FIG. 6 is a view illustrating a method of selecting a broadcasting tuner and a channel performed by an IP STB in a method of distributing same/different digital broadcasting streams in a heterogeneous home network according to an embodiment of the present invention. If a user inputs broadcast and channel selection information through the IP STB 130 of FIG. 1 or the home server 200 of FIG. 2, the corresponding channel is selected through the control of the broadcasting tuners 210, 211 and 212 and the broadcasting TS is transmitted through the broadcast distributor 230.

First, if the home server 200 receives an input of the broadcast and channel selection information from the user, it sends a message having the broadcast and channel selection information input by the user to the central processing unit 250 through the IP home network matching device 270 (step S201). The central processing unit 250 searches for tuner type information from the received message, and determines a tuner type of the broadcast required by the user (step S202). If the tuner is an IP tuner, the central processing unit 250 receives the corresponding channel broadcast among the received IP broadcasts input to the Ethernet switch 240, and transmits the corresponding channel broadcast to the MPEG2 decoder 260 after removing the IP header from the channel broadcast. The MPEG2 decoder 260 decodes the received channel broadcast and transmits the decoded channel broadcast to the following HDTV (step S203). If the broadcast desired by the user is a cable broadcast, the control signal having the tuner number and the channel number is transferred to the broadcasting TS selector 220, and the broadcasting TS of the corresponding channel extracted by the cable tuner 212 is transferred to the MPEG2 decoder 260 through the broadcasting TS selector 220 (step S204).

By contrast, if an input of the broadcast and channel selection information is received from the user of the IP STB 130, the IP STB transfers a packet having the tuner number and the channel number input by the user to the central processing unit 250 through the Ethernet switch 250 (step S205). Then, the central processing unit 250 determines a tuner type of the broadcast required by the user from the received tuner number (step S206). If the tuner is a ground-wave tuner, the central processing unit 250 transfers the control signal having the tuner number and the channel number to the broadcasting TS selector 220, and simultaneously transfers the destination IP information to the broadcast distributor 230 (step S207). Meanwhile, the broadcasting TS of the corresponding channel extracted by the ground-wave tuner 210 is transferred to the broadcast distributor 230 through the broadcasting TS selector 220, and the broadcast distributor 230 carries the selected broadcasting TS on the destination IP, and transfers the broadcasting TS to the IP STB 130 through the Ethernet switch 240 (step S208).

As described above, according to the apparatus and method for distributing same/different digital broadcasting streams in a heterogeneous home network according to the present invention, a plurality of tuners are installed so as to enable a user to simultaneously view broadcasts having different broadcasting systems or to simultaneously view a plurality of channel broadcasts if one of the broadcasting systems is selected by the user, and the user having a plurality of HDTV receivers at home can simultaneously view a plurality of HDTV broadcasts irrespective of the broadcasting systems if a plurality of heterogeneous home networks match through a home network matching device.

While the present invention has been described and illustrated herein with reference to the preferred embodiment thereof, it will be understood by those skilled in the art that various changes and modifications may be made to the invention without departing from the spirit and scope of the invention, which is defined in the appended claims.

What is claimed is:

1. An apparatus for distributing same/different digital broadcasting streams in a heterogeneous home network, the apparatus comprising:

a home gateway, connected through Ethernet to a first IP (Internet Protocol) STB (Set Top Box) connected to an HDTV receiver, for accessing the network; and a home server, connected to the home gateway through Ethernet and also connected to a PC, a second IP STB, a 1394 STB, an HAS (Home Auto System) and an HDTV receiver, for outputting a ground-wave broadcast, a satellite broadcast and a cable broadcast to their HDTV receivers, respectively, through the second IP STB and the 1394 STB if the ground-wave broadcast, the satellite broadcast and the cable broadcast are received through coaxial cables, interworking with the HAS in order to control home appliances, and directly outputting the broadcast to an HDTV receiver through a built-in STB function; wherein the home server includes:

a broadcasting TS (transport stream) selector for selecting and outputting one of three broadcasting TSs extracted from the tuners;

a broadcast distributor configured to:

convert the selected broadcasting TS into a packet of a broadcasting TS over an IP and output the packet if the destination of the selected broadcasting TS is the second IP STB, convert the selected broadcasting TS into a packet of a broadcasting TS over a 1394 frame and output the packet if the destination of the selected broadcasting TS is the 1394 STB, and convert the selected broadcasting TS into a packet of a broadcasting TS over an IP and output the packet outside if the broadcasting TS to be transmitted to the outside is received; and an Ethernet switch for receiving and outputting an IP broadcasting TS (Transport Stream) being carried on the IP from the home gateway through an Ethernet port, and if the packet of the broadcasting TS over an IP that is the broadcasting TS carried on the IP from the broadcast distributor is received, transmitting the received packet to the home gateway through the Ethernet.

2. The apparatus as claimed in claim 1, wherein the home server comprises:

a ground-wave tuner for receiving the ground-wave broadcast through the coaxial cable and extracting a ground-wave broadcasting TS (Transport Stream) from the ground-wave broadcast;

a satellite tuner for receiving the satellite broadcast through the coaxial cable and extracting a satellite broadcasting TS from the satellite broadcast;

a cable tuner for receiving the cable broadcast through the coaxial cable and extracting a cable broadcasting TS from the cable broadcast;

a central processing unit for transferring a channel selection message it a user selects a broadcasting channel and simultaneously transferring information capable of generating an IP header and a 1394 header suitable for a user's tuner and channel selection information to the broadcast distributor, if the IP broadcasting TS being carried on the IP is received from the Ethernet switch and the received broadcasting TS is the IP broadcasting TS to be transmitted to the second IP STB, transferring the IP broadcasting TS with the IP header attached thereto, and if the received broadcasting TS is not the IP broadcasting TS to be transmitted to the second IP STB, removing the IP header from the IP broadcasting TS and outputting the IP broadcasting TS without the IP header attached thereto;

an MPEG2 decoder for generating a control signal corresponding to the channel selection message to control the ground-wave tuner, the satellite tuner and the cable tuner if the channel selection message is received from the central processing unit, decoding and outputting the IP broadcasting TS to the HDTV receiver if the IP broadcasting TS is input from the central processing unit, and decoding and outputting the broadcasting TS to the HDTV receiver if the broadcasting TS is input from the broadcasting TS selector;

an IP home network matching device for transferring the packer of the broadcasting TS over an IP or the IP broadcasting TS to the second IP STB if the packet of the broadcasting TS over an IP is received from the broadcast distributor or if the IP broadcasting TS is input from the central processing unit;

a 1394 home network matching device for receiving the packet of the broadcasting TS over a 1394 frame from the broadcast distributor and transferring the packet to the 1394 STB; and a tuner/channel selection information input device for outputting a tuner or channel selection message to the central processing unit if the user selects the channel or the channel.

3. The apparatus as claimed in claim 1, wherein the channel selection of the IP broadcast, the ground-wave broadcast, the satellite broadcast or the cable broadcast is performed by the user's direct input of the selection information through the tuner/channel selection information input device, by the user's input of the selection information through the second IP STB or the 1394 STB, or by the input of the selection information through the first IP STB connected to the home gateway.

4. The apparatus as claimed in claim 2, wherein the broadcast distributor comprises:

two TS receiving units for generating and outputting headers by the same header information to match a protocol for transferring the broadcasting TSs to a destination using header generation information received from the central processing unit according to the destination of the received broadcasting TSs;

two multiplexers for receiving and multiplexing the same header information from the two TS receiving units;

an IP transmitting unit for receiving and transmitting packets multiplexed by one of the multiplexers using the IP as a discriminator;

a 1394 transmitting unit for receiving and transmitting the packets multiplexed by the other of the multiplexers using the 1394 device number as a discriminator;

an MII transmission matching unit for receiving and transmitting the multiplexed packets from the IP transmitting unit if the Ethernet is judged as the next destination;

a PCI transmission matching unit for receiving and transmitting the multiplexed packets from the IP transmitting unit or the 1394 transmitting unit if it is judged that the packets are transferred to the next destination through a PCI;

an MII reception matching unit for receiving the broadcasting TS input through the Ethernet switch;

a PCI reception matching unit for receiving the broadcasting TS input through the PCI;

an IP receiving unit for receiving the packets from the MII reception matching unit or the PCI reception matching unit and removing IP, UDP and RTP (Real Time Protocol) headers from the packets in order if the received TS is the packet carried on the IP;

an 1394 receiving unit for receiving the packets from the PCI reception matching unit and removing a 1394 header from the packets if the received TS is the packet carried on the 1394 frame;

two demultiplexers for receiving and demultiplexing the packets input from the IP receiving unit or the 1394 receiving unit; and two TS transmitting units for receiving and transmitting the packets input from the two demultiplexers.

5. The apparatus as claimed in claim 2, wherein the Ethernet frame in the form of an IP packet through which the broadcast distributor transmits the broadcasting TS to the destination using a protocol of a destination includes an Ethernet header; an IP packet composed of an IP header, a UDP header, an RTP (Real Time Protocol) header and the broadcasting TS; and an FCS (Frame Check Sum).

6. The apparatus as claimed in claim 2, wherein the PCI frame in the form of an IP packet through which the broadcast distributor transmits the broadcasting TS to the destination using a protocol of a destination includes a PCI header; an IP packet composed of an IP header, a UDP header, an RTP (Real Time Protocol) header and the broadcasting TS; and an FCS (Frame Check Sum).

7. The apparatus as claimed in claim 2, wherein the PCI frame in the form of a 1394 packet through which the broadcast distributor transmits the broadcasting TS to the destination using a protocol of a destination includes a PCI header; a 1394 packet composed of a 1394 ISO (Isochronous) header and the broadcasting TS; and an FCS (Frame Check Sum).

* * * * *